United States Patent
Wang

Patent Number: 5,611,477
Date of Patent: Mar. 18, 1997

[54] SHOT SLEEVE AND METHOD OF MAKING

[75] Inventor: Yucong Wang, Saginaw, Mich.

[73] Assignee: General Motors Corporation, Detroit, Mich.

[21] Appl. No.: 415,398

[22] Filed: Apr. 3, 1995

[51] Int. Cl.⁶ ................................. B23K 20/08
[52] U.S. Cl. ........................ 228/107; 29/421.2
[58] Field of Search ............... 228/107, 127; 29/421.2

[56] References Cited

U.S. PATENT DOCUMENTS

| | | | |
|---|---|---|---|
| 3,515,203 | 6/1970 | Parlanti et al. | 164/312 |
| 3,735,476 | 5/1973 | Deribas et al. | 228/107 |
| 4,120,439 | 10/1978 | Persson | 228/107 |
| 4,133,471 | 1/1979 | Niwatukino | 228/107 |
| 4,926,926 | 5/1990 | Zecman | 164/312 |

FOREIGN PATENT DOCUMENTS

| | | | |
|---|---|---|---|
| 3936991 | 10/1990 | Germany | 29/421.2 |
| 2198381 | 6/1988 | United Kingdom | 228/107 |

*Primary Examiner*—P. Austin Bradley
*Assistant Examiner*—Jeffrey T. Knapp
*Attorney, Agent, or Firm*—Lawrence B. Plant

[57] ABSTRACT

A pressure casting machine having a shot sleeve including a highly thermally conductive metal tube having an erosion-resistant and wear-resistant cermet interatomically bonded to the inside surface of the tube may be made by using an explosive compaction and bonding process.

25 Claims, 3 Drawing Sheets

005,611,477

SHOT SLEEVE AND METHOD OF MAKING

This invention relates to a shot sleeve for an horizontal pressure casting machine and a method of making same.

BACKGROUND OF THE INVENTION

Horizontal pressure casting machines (e.g., die casting and squeeze casting machines), include a die having a cavity therein for receiving and shaping molten metal and a shot sleeve for injecting the molten metal into the cavity. The shot sleeve is essentially a cylinder having a piston at one end and an opening at the other end communicating with the die cavity. Molten metal is poured into the cylinder via a filler hole in the cylinder wall located between the piston and the opening to the die cavity. To cast the metal, the piston advances pass the filler hole, causes the molten metal to fill the cross section of the cylinder, and pushes the molten metal, under pressure, into the die cavity.

In horizontal pressure casting machines the longitudinal axis of the shot sleeve is horizontal, and the shot sleeve is only filled up about half way with molten metal. As a result, the lower half of the shot sleeve is subjected to significantly higher temperatures than the upper half. This thermal differential can cause the shot sleeve to distort, or warp, unless the heat in the lower half can somehow be rapidly dissipated and spread more evenly over the entire shot sleeve. To this end, it is known to make a multilayered shot sleeve including an inner layer comprising a highly thermally conductive material, such as copper-beryllium alloy, to dissipate the heat build up (e.g., see Zecman U.S. Pat. No. 4,926,926). Zecman welds a copper tube about a steel liner and then shrink fits another steel tube about the copper tube. Shrink fitting of the outer tube leaves the inner barrel in compression and traps the copper tube between the outer tube and inner barrel.

The inside surface of shot sleeves are also susceptible to wear resulting from the piston's reciprocating back and forth therein, and to erosion by metals such as aluminum. To reduce the effects of wear and erosion in shot sleeves, it is known to line the inside surface of shot sleeves for vertical pressure casting machines with a cermet material. One known such shot sleeve comprises an H-13 steel tube having a TiC-Ti cermet material sintered in situ between a mandrel and the H-13 tube to form a liner for the tube. No bond is formed between the liner and the tube, and gaps of as much as ½ mm therebetween exist.

Shot sleeves made using the aforesaid techniques have some deficiencies. For example, in the cermet lined sleeve air gaps between the cermet lining and the H-13 steel tube cause nonuniform heat transfer therebetween. This condition is worsened at higher temperatures as the steel tube expands away from the cermet lining. Similarly in multilayered shot sleeves containing a highly thermally conductive, but unbonded, layer, air gaps can form between the several unbonded layers which reduce the effectiveness of the conductive layer in adequately dissipating the heat. For example, Zecman welds a copper tube to the exterior of an inner steel barrel, and then shrink fits an outer shell over the copper tube. Such layers are not bonded to each other and can have thermally resistant interfaces between the several layers. Another multi-layer design contemplates an inner H-13 steel tube surrounded by a copper tube which, in turn, is sheathed in an H-13 steel outer sleeve. The several layers are closely machined, and then simply pressed together with no bonding between the layers. Such assembly techniques do not provide the most effective uniform interfacial contact between the copper and the steel tubes that sandwich it and result in less effective thermal conduction between the layers then might otherwise be possible if a more intimate interface between the copper and the inner/outer tubes had been achieved.

The present invention contemplates a long-lived, multilayered shot sleeve comprising a highly thermally conductive material and an erosion/wear resistant material interatomically bonded to each other for excellent heat transfer between the materials.

SUMMARY OF THE INVENTION

In one aspect, the invention contemplates a machine for pressure casting molten metals (e.g., die casting, squeeze casting, etc.) comprising a die having a cavity therein for receiving and shaping molten metal under pressure, and a shot sleeve for injecting the metal into the cavity. The shot sleeve comprises a highly thermally conductive metal tube which is lined with, and interatomically bonded to, an erosion resistant and wear resistant cermet over substantially the entire interfacial area therebetween. The highly thermally conductive tube will preferably have a strengthening outer sheath encasing and interatomically bonded thereto over substantially the entire interfacial area therebetween. Inter atomic bonding of the tube to the cermet and/or the sheath over their entire interfacial area(s) insures that there are no air gaps between the thermally conductive tube and the cermet/sleeve to interfere with heat transfer.

The present invention also contemplates a method for making a multi-layered shot sleeve comprising the steps of positioning a mass of cermet precursor particles (e.g., TiC or $TiB_2$ and Ti alloy) contiguous the inside surface of a highly thermally conductive tube (e.g., Cu—Be alloy); locating the tube and particles in the chamber of a container having a forming surface therein; filling the chamber with an explosive material along the length of the tube on the side of the tube opposite the forming surface; and progressively burning the explosive material along the length of the tube so as to provide a high pressure front which moves progressively along the length of the tube tracking the front of the explosive material as it burns so as to progressively deform the tube and the particles against the forming surface, and to interatomically bond the particles to each other and to the tube as the pressure front travels the length of the tube. The tremendous pressures generated by progressively burning the explosive cause plastic flow of the metal component (i.e., Ti alloy) of the cermet precursor mix around the ceramic component (e.g., TiC or $TiB_2$) and interatomic bonding of the components to completely and securely embed the ceramic particles in a matrix of the metal component.

In accordance with a preferred embodiment of the invention, the highly thermally conductive tube will itself be encased in, and interatomically bonded to, an outer strengthening metal sheath at the same time that it is bonded to the cermet lining. Deforming the highly thermally conductive tube (and sheath when present) according to the present invention also serves to work harden the tube (and sheath) to strengthen the shot sleeve against forces tending to distort/warp it.

In one embodiment of the invention, the forming surface comprises the external surface of a cylindrical mandrel located in the center of the chamber, with the tube/particles surrounding the mandrel. The explosive material is located outboard the tube between the tube and the walls of the container defining the chamber such that the tube and particles collapse onto the mandrel as the explosive material burns. In another embodiment of the invention, the container is a pressure bomb, the forming surface comprises a wall of the bomb defining the pressure chamber, and the explosive material is located inside the tube such that the tube and particles expand outwardly against the wall during the burning.

The explosive material will preferably be ignited at one end of the chamber and progressively burn in one direction along the full length of the tube.

The forming surface against which the tube/particles are formed will preferably be provided with a release agent, or the like, for preventing bonding of the shot sleeve materials to the forming surface. The release agent may comprise any of a variety of things including coatings (e.g., paint) or paper wrap.

DETAIL DESCRIPTION OF CERTAIN EMBODIMENTS

Figure 1:
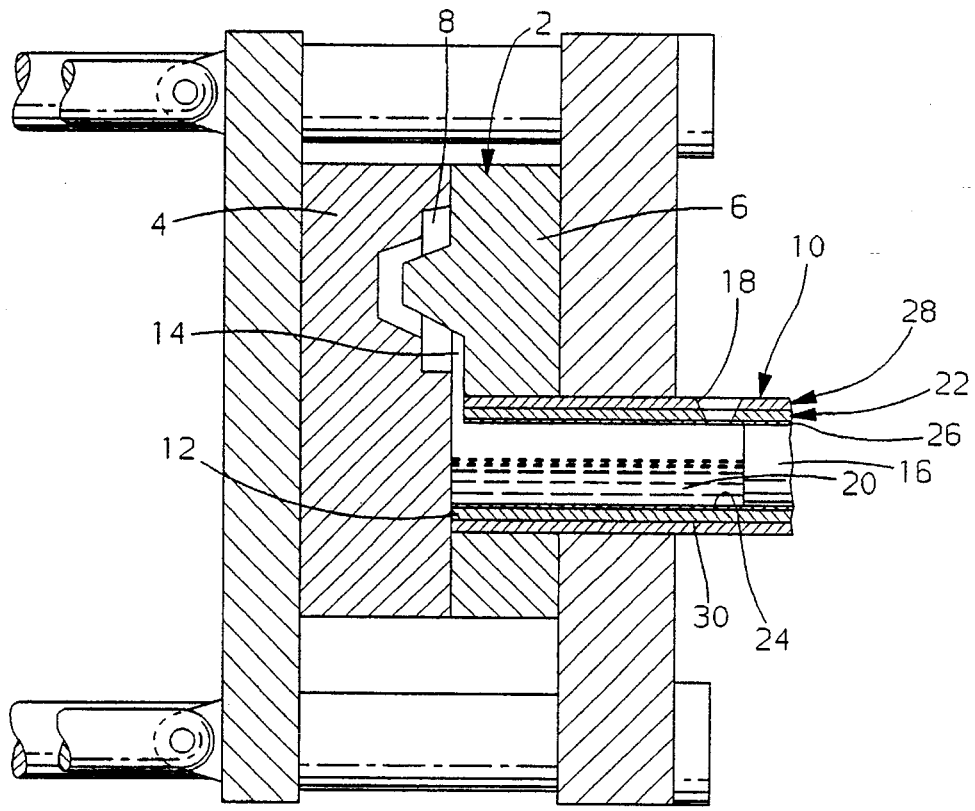
FIG. 1 illustrates, in a side sectional view, a horizontal pressure casting apparatus in its most elemental form.

FIG. 1 depicts, in elementary form, a pressure casting machine including a die set 2 including a first die half 4 and a second die half 6 together defining a molding cavity 8 therebetween. The die half 6 includes a shot sleeve 10 having one end 12 communicating with the molding cavity 8 via a gate and runner system 14. A piston 16 moves axially in the shot sleeve 10. When the piston 16 is in its retracted position (shown in FIG. 1), the shot sleeve 10 is filled by pouring molten metal (e.g., Al) through the opening 18. In its extended position, the piston pushes the molten metal 20 into the mold cavity 8 via the runner-gate system 14. Because the piston 16 must advance passed the opening 18 without expelling molten metal 20 through the opening 18, the shot sleeve 10 cannot be filled completely. Rather, it is typically filled to only about one half its volume, as illustrated. As a result, the lower half of the shot sleeve 10 is subjected to significantly higher temperatures and erosive exposure to the molten metal than the upper half. The temperature imbalance between the upper and lower halves induces thermal stresses in the sleeve which tend to cause distortion and warpage of the sleeve 10.

To reduce the incidence of warpage while providing wear and erosion resistance a unique multi-layer shot sleeve 10 and method of its manufacture is provided. The sleeve 10 includes a center layer 22 comprised of a highly thermally conductive material, such as copper, molybdenum, silver and alloys thereof. The tube 22 will preferably comprise a copper-beryllium alloy (e.g., C82000 or C82200), and serves to rapidly conduct the heat away from the bottom half of the shot sleeve and circumferentially distribute it more uniformly throughout the entire shot sleeve 10. The inside surface 24 of the highly thermally conductive tube 22 is interatomically bonded to a cladding of cermet material 26 formed in situ on the surface 24. The thermally conductive layer 22 may be made thick enough to provide whatever strength is needed by the shot sleeve. Preferably however, the high thermally conductive tube will be too thin for strength purposes and will be encased in an outer sheath 28 of steel for strengthening the shot sleeve 10 against distortion and warpage. Like the cermet cladding 26, the outer sheath 28 is interatomically bonded to the outside surface 30 of the highly thermally conductive tube 22.

In order to insure good, uniform conduction of heat throughout the shot sleeve it is important that the cermet material 26 be intimately bonded to the tube 22 over the entire interface between the tube 22 and the cermet such that there are no gaps therebetween to impede heat flow into the tube 22. Such bonding also reduces the possibility of the tube 22 separating from the cermet when heated owing to their different coefficients of thermal expansion. Similarly, when a reinforcing metal sheath 28 is used, it is important that the tube 22 be intimately bonded to the sheath to likewise insure good uniform heat conduction between the tube 22 and the sheath 28. To this end, the process of the present invention clads the inside surface 24 of the tube 22 with a cermet material 26 so as to form an interatomic bond between the cermet material and the tube 22, and, when used, forms an interatomic bond between the outer sheath 28 and the tube 22. Interatomic bonding occurs when the atoms at the surfaces of the respective materials being bonded together are pushed so close together that they reach equilibrium spacing between their respective atoms. Equilibrium spacing of a pair of atoms is that at which the attractive force and the repulsive force between such atoms are equal and the energy of interaction between the atoms is at its lowest. At this spacing, the materials are essentially inseparable at their interface, and the bond strength is equal to, or slightly greater than, the strength of the weaker of the two materials being bonded.

In accordance with the process aspect of the present invention, a cermet lining is formed in situ, and interatomically bonded to, the thermally conductive tube 22 utilizing an explosive compaction and welding technique. Moreover when the thermally conductive tube 22 is encased in an outer steel sheath 28, the tube 22 and sheath 28 are likewise interatomically bonded together at the same time that the cermet layer 26 is formed and bonded to the tube 22.

Figure 2:
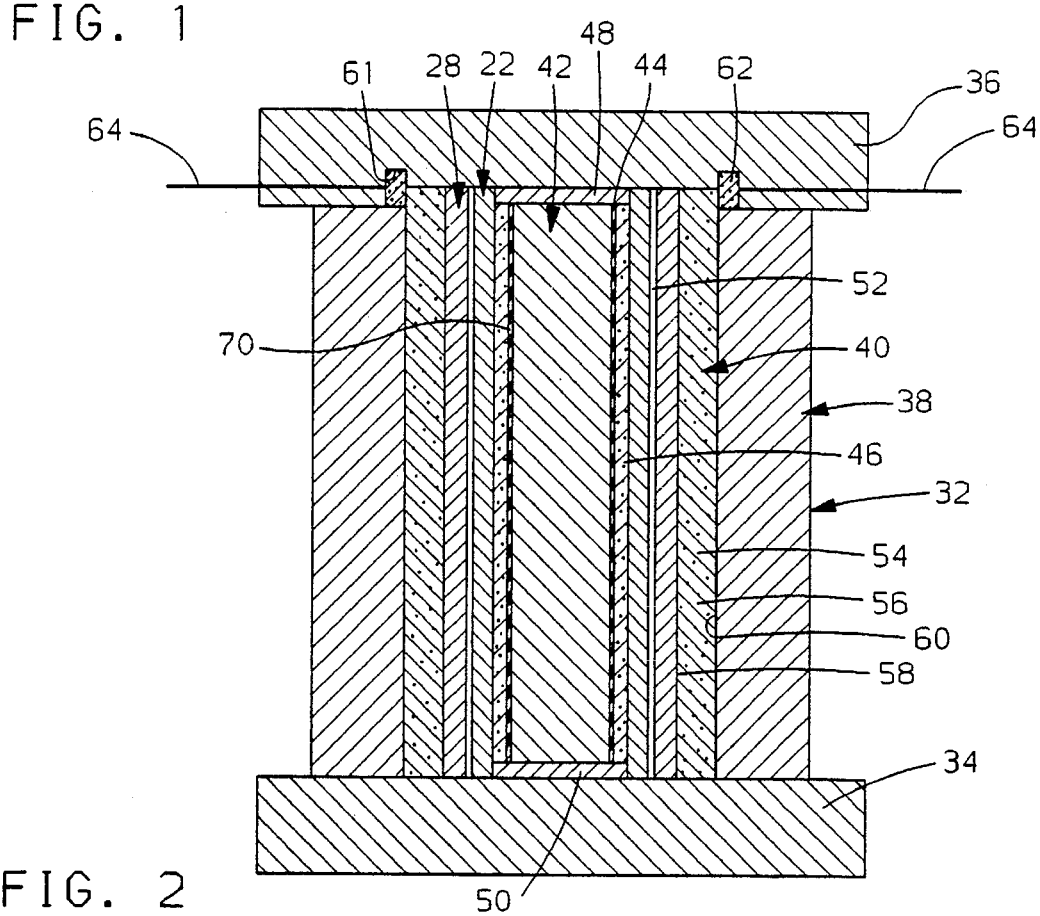
FIG. 2 is a side sectional view of a high pressure bomb used to manufacture shot sleeves before ignition of the explosive material.

FIGS. 1 and 2 illustrate one embodiment of a technique for making a shot sleeve according to the process of the present invention. A container 32 is a pressure bomb and comprises a pedestal 34, a cover 36 and a body portion 38 secured to the pedestal 34 together defining a chamber 40 for containing the shot sleeves components and an explosive. A steel mandrel 42 is centrally located within the chamber 40. A thin paper sleeve 44 fits snugly over the mandrel 42 to function as a release agent for preventing bonding of the shot sleeve components to the mandrel. A layer of paint may be substituted for the paper sleeve 44. A highly thermally conductive tube 22 is positioned over the mandrel 42 and has an inside diameter greater than the outside diameter of the paper sleeve 44 so as to provide an annular gap 46 (i.e., ca. 3.0 millimeters to ca. 10.0 millimeters) therebetween. The highly thermally conductive material will preferably comprise copper or its alloys and particularly Cu—Be alloys. Alternatively, such metals as silver or molybdenum and their alloys could be used. The gap 46 is filled with cermet precursor material and packed therein to a density of about 60 to about 85 percent of theoretical density. The precursor material comprises a mixture of ceramic powder and metal powder which is subsequently explosively compacted and bonded together. A preferred such cermet precursor material is a mixture of titanium alloy powder (i.e., ca. 5—50 microns particle size) and titanium carbide or titanium diboride ceramic particles (i.e., ca. 5–45 microns), wherein the ceramic particles comprise about 40 to about 70 volume percent of the mixture. Suitable titanium alloys for this purpose include Ti-6Al-4V, and Ti-6Al-2Sn-4Zr-2Mo. Metal end plates 48 and 50 secured to the mandrel serve to center the tube 22 on the mandrel 42, and to contain the cermet precursor powder in the gap 46 between the tube 22 and the mandrel 42. A reinforcing H-13 steel sheath 28, having an inside diameter slightly greater than the outside diameter of the copper tube 22, is positioned over the tube 22 so as to provide a small annular gap 52 therebetween. Finally, an explosive mixture 54 is packed into the annular region 56 between the outside surface 58 of the sheath 28 and the inside surface 60 of the body 38 defining the chamber 40. Explosives useful with the present invention include ammonium nitrate based mixtures such as Anfo (ammonium nitrate with 6% fuel oil), Trimonite 1 (80% ammonium nitrate, 10% TNT, 10% aluminum powder), Trimonite 3 (80% ammonium nitrate, 20% TNT), and Ammonal (83% ammonium nitrate, 12% TNT, 5% aluminum powder). Other suitable explosive may, of course, be used. After the several components have been stacked and packed in the chamber 40, the cover 36 is anchored in place. The cover 36 includes an annular groove 61 for containing a ring of explosive primer 62. Several electrical detonators 64 extend from the primer explosive 62 to ignite the primer explosive 62 at several locations simultaneously to achieve substantially uniform detonation of the primer about its circumference. Electric detonators consist of a bridge wire embedded in a flashing composition, which readily ignites when an electric current heats the wire. Once detonated, the primer explosive 62, in turn, detonates the main explosive 54 which is the primary explosive for effecting the explosive welding and compaction of the present invention.

Figure 3:
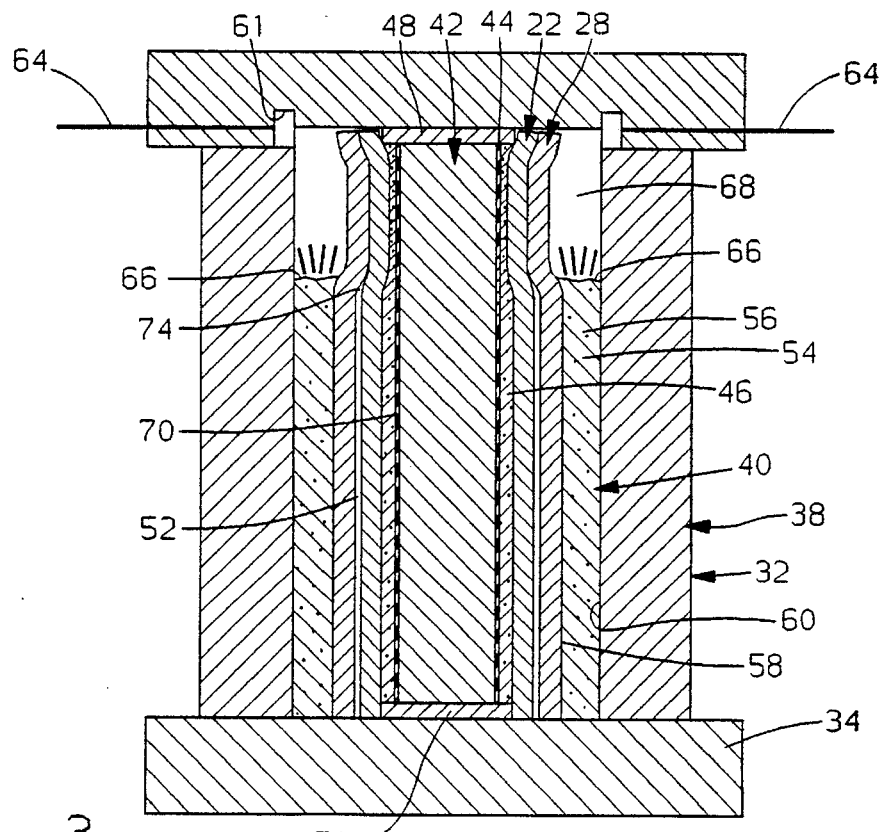
FIG. 3 is a view like that of FIG. 2, but subsequent to ignition of the explosive material.

As best shown in FIG. 3, the main explosive 54, once detonated, burns progressively from one end of the tube 22 to the other end of the tube 22 (i.e., from top to bottom in the Figure) with a burn front 66. When this occurs, tremendously high pressures are built up in the region 68 adjacent the burn front 66 which causes tremendous compressive forces to act upon the cermet material 46, the tube 22 and the outer sheath 28 causing them to collapse upon each other and the mandrel 42. The mandrel 42 has an exterior forming surface 70 which serves to define the interior shape of the shot sleeve when the cermet, tube 22 and sheath 28 are collapsed thereabout. The pressures generated in the region 68 are so high as to cause the cermet precursor particles to interatomically bond to each other and to the inside surface of the tube 22. At the same time, the outer sheath 28 interatomically bonds to the outside surface of the tube 22. The nature of the process is such that bonding occurs over substantially the entire interfaces between the cermet and the tube 22, and between the sheath 28 and the tube 22. Such extensive interfacial bonding between the several layers insures that there are no air gaps between the respective components to interfere with good thermal conduction therebetween, and promotes optimal conduction between such components. More specifically, as the detonation front progresses along the length of the tube, the high pressure generated deforms and accelerates the sheath 28 across the gap 52 toward the tubing 22 at a very high velocity. The sheath 28 impacts the tube 22 at an angle 74 which generates extreme localized pressure at the collision site which pressure is much higher than the yield strength of both the sheath 28 and the tube 22. Under the influence of this high pressure and angular collision, the surrounding metal surfaces act as viscous fluids and a few microns of the respective materials are jetted into the gap ahead of the progressing collision point. This jet consists of a combination of surface contaminants, a few microns of the metal surface layers and compressed air. As the detonation front progresses, the jet travels ahead of the collision point sweeping contaminants away from the bonding surfaces which then come into intimate contact with each other under sufficiently high pressure as to cause them to become interatomically bonded one with the other. Essentially, solid state bonding occurs with no significant phase transformation or intermetallic phase formation at the interface. Indeed, there is no significant heat associated with the bonding processes other than that heat which is generated by the plastic working of the components near the interface and adiabatic compression temporarily imposed on the material. Moreover, since the bonding process is essentially instantaneous, no diffusion occurs at the interface. Concurrent with bonding, work hardening of the sheath 28 and the tube 22 occurs which increases the material's strength and resistance to warpage.

At the same time as the sheath 28 collapses about the tube 22, the tube 22 moves toward the mandrel 42 and explosively compacts the cermet precursor material in the gap 46 so as to densify it and cause it to interatomically bond to itself and to the inside surface 26 of the tube 22. Under the tremendous compaction forces generated by the burning explosive, the metallic particles in the cermet precursor mixture flow around the ceramic particles under extremely high pressures, and intimate bond to one another and to the inside surface of the tube 22.

An explosive mixture 54 is used which has a detonation velocity less than the compressive wave velocity of either the tube 22 or the sheath 28. That is, the detonation velocity is such that the collision front travels at a velocity below the sonic velocity of the materials being bonded. This will allow the associated pressure front to precede the collision front. As a result, the two approaching metal surfaces are subjected to an increasing pressure, culminating at a peak pressure on impact at the collision front.

Figure 4:
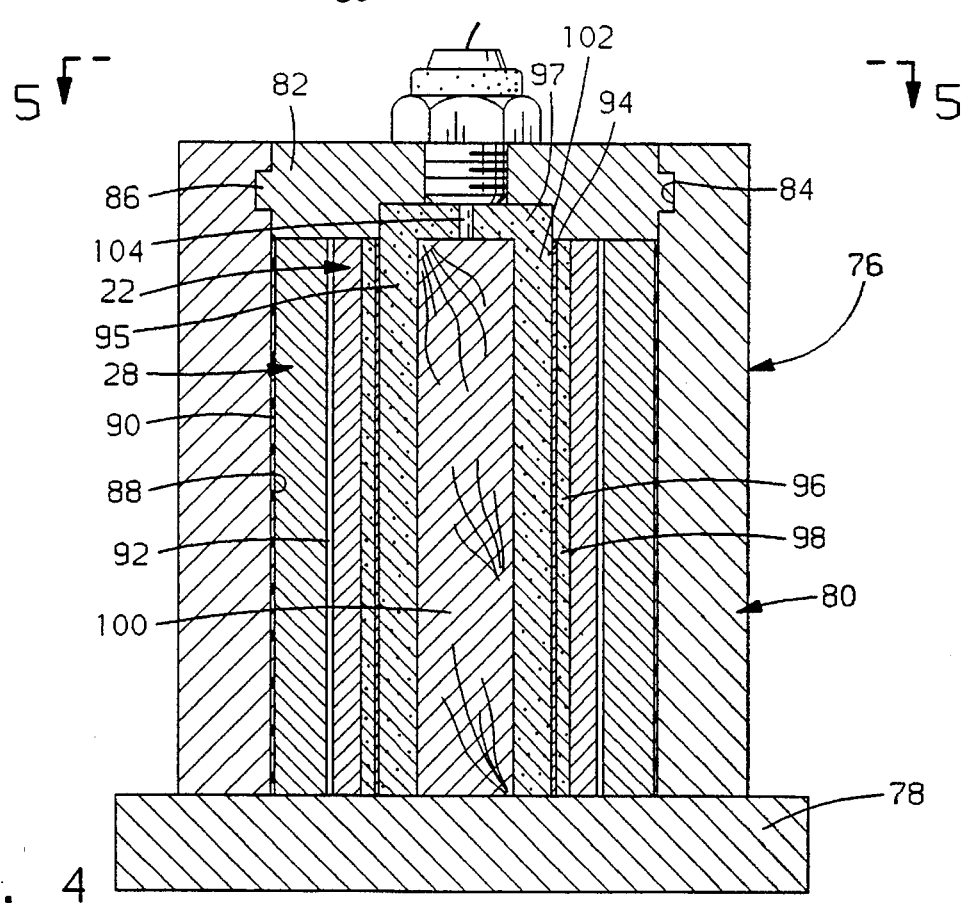
FIG. 4 is a side sectional view of another high pressure bomb useful to manufacture shot sleeves in accordance with another embodiment of the invention.
Figure 5:
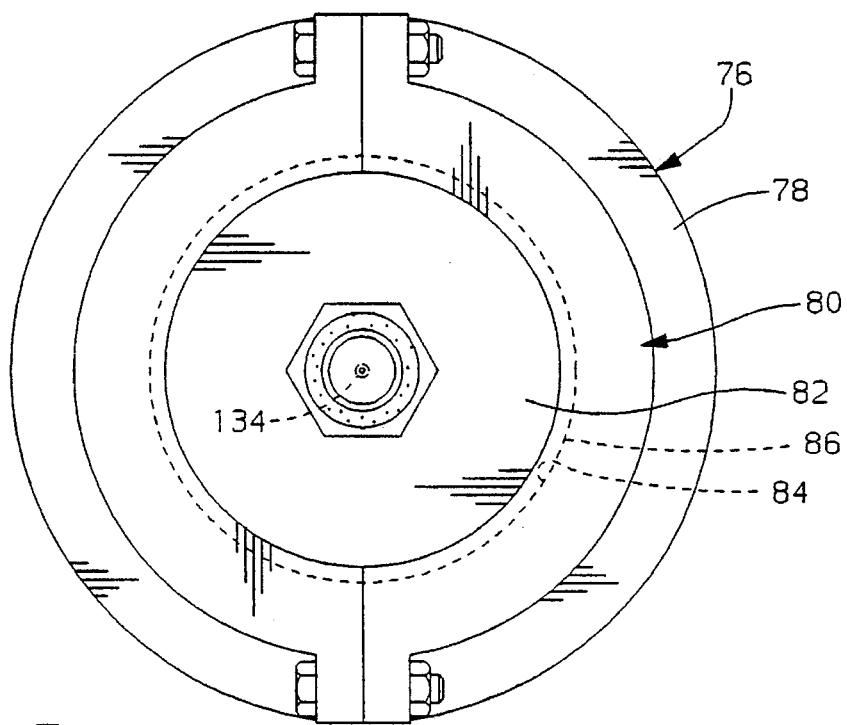
FIG. 5 is a plan view in the direction 5—5 of FIG. 4.

FIGS. 4 and 5 illustrate another embodiment of the present invention wherein the respective components are expanded outwardly against the inside walls of the bomb—rather than inwardly against a mandrel. FIGS. 4 and 5 depict a high pressure bomb 76 including a pedestal 78, a body portion 80 secured to the pedestal 78 and a cover 82. The cover 82 includes an annular rib 86 which fits into an annular groove 84 in the body portion 80 to prevent the cover 82 from blowing off of the body 80. The inside surface 88 of the body 80 serves as the forming surface for the shot sleeve and is coated with a thin layer 90 of paint, or the like, to prevent bonding of the outer reinforcing sheath 28 thereto. In this embodiment, the outside diameter of the annular sheath 28 is only slightly less than the inside diameter of the body 80 such that when the sheath 28 is positioned in the body 80 it is in close fitting relating thereto so that very little radial expansion thereof occurs. This may conveniently be effected by constructing the bomb 76 in two parts, as best shown in FIG. 5, so that it may be readily separated to permit snug placement of the sheath 28 therein, and ready removal of the shot sleeve therefrom following detonation. The conductive tube 22 has an outside diameter which is less than the inside diameter of the sheath 28 such that when positioned within the sheath 28 an annular gap 92 is formed therebetween. A thin metal tube 94 (e.g., steel or copper) is placed inside the tube 22 so as to provide an annular gap 96 therebetween into which the cermet precursor powder 98 is packed. A hardwood core 100, or the like, is positioned in the center of the thin metal tube 94, but is spaced therefrom by annular gap 95. Explosive material 102 is packed into the annular gap 95 between the wooden core 100 and the metal tube 94 as well as into the region 97 atop the core 100. Alternatively, the core could be eliminated and the tube 94 completely filled with explosive. A detonator 104 is located in the cover 82. The detonator consists of a thin-walled copper or aluminum tube which is closed at one end, and filled with a charge of primary high explosive and a base charge of some secondary explosive as is well known to those skilled in the art. The primary charge can be lead azide or a 2:1 mixture of lead azide and lead styphnate with 3% powdered alumina known as ASA. The base charge may be pentaerythritol tetranitrate (PETN) or crclotrimethylene trinitramine (RDX). Electric detonators may also be used.

When the detonator 104 is energized the explosive 102 begins to burn progressively radially outwardly therefrom initially along the top of the core 100, and then progressively down along the full length of the core 100. As the explosive 102 progressively burns it generates tremendous internal pressure and progressively expands the tube 22 radially outwardly into engagement with the inside surface of the reinforcing sheath 28, and so as to interatomically bond the tube 22 and sheath 28 together in the same manner as discussed above in connection with the embodiment shown in FIGS. 2 and 3. Similarly, the burning explosive expands the metal tube 94 causing it to press against the cermet precursor material which causes the cermet precursor particles 96 to interatomically bond to themselves and to the inside surface of the thermally conductive tube 22. After removal from the bomb 76, the thin metal tube 94 is machined away leaving a precisely machined cermet surface on the inside of the tube 22.

Figure 6:
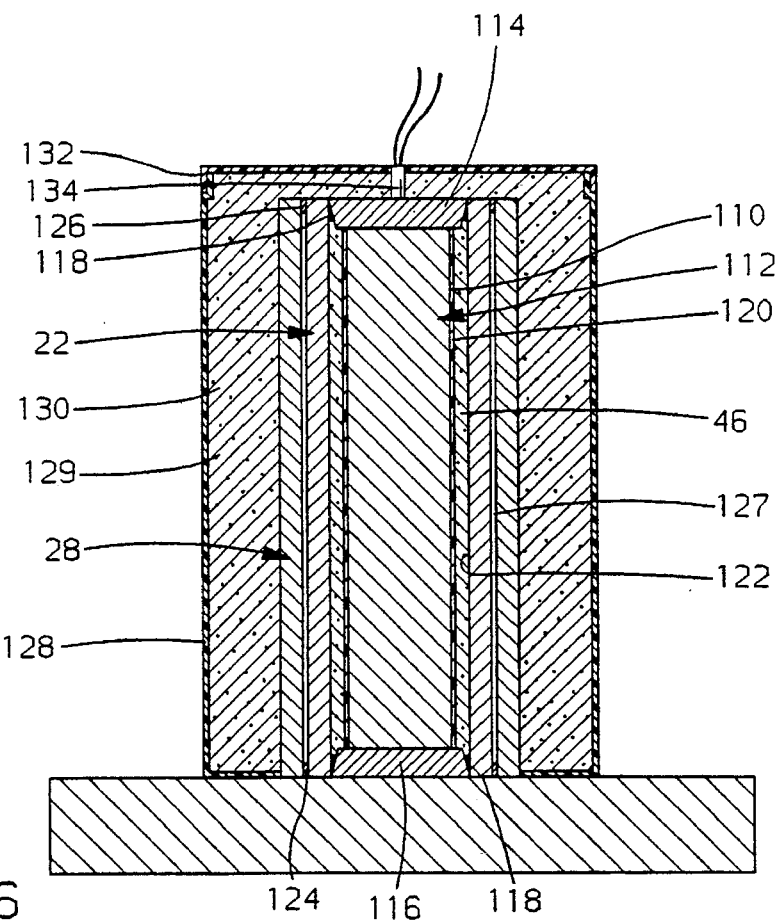
FIG. 6 is a side sectional view of a frangible used to make shot sleeves according to still another embodiment of the present invention.

FIG. 6 depicts still another embodiment of the present invention utilizing a frangible container which is shattered or blown away by the explosive following detonation. A thin sheet metal or polymeric canister (e.g., polypropylene) is suitable for this purpose. In this embodiment, all of the shot sleeve's component parts are packaged in the canister 128, and moved to a suitable site where detonation can safely occur. More specifically, a mandrel 112 is centered between two end caps 114 and 116, which have a greater diameter than the mandrel 112. The thermally conductive tube 22 has an inside diameter approximating that of the outside diameter of the end caps 114 and 116, and is welded, soldered, or brazed 118 to the end cap 116. The mandrel 112 has a layer of paint 120 on the surface thereof and is centered on the end cap 116. The cermet material 46 is packed into the gap between the outside forming surface 110 of the mandrel 112 and the inside surface 122 of the tube 22. Thereafter, the end cap 114 is joined (e.g., welded, soldered, brazed, etc.) to the mandrel 112 and the tube 22 such that the cermet precursor particles are completely contained. Annular spacers 124 and 126 are placed around the ends of the tube 22 and serve to space a reinforcing sheath 28 from the outside surface of the tube 22 by a gap 127. This assembly is placed within a thin (i.e., ca. 5 mm) plastic (e.g., polypropylene) canister 128, and the space 129 between the outside surface of the sheath 28 and the inside surface of the canister 128 filled with explosive material 130. An end cap 132 carrying an electrical detonator 134 is placed over the preloaded canister 128. Upon detonation, the explosive 130 burns down along the outside of the sheath 28 causing implosive compression of the sheath against the tube 22, the tube 22 against the cermet particles 46, and the cermet precursor particles against the mandrel 112. The pressures are such as to cause interatomic bonding of the respective materials with each other. Unlike the previous embodiments, this embodiment does not require containment of the explosives within a high pressure bomb.

The outer structural sheath could be comprised of a variety of different metals, but will preferably be made of metals having high hot strength including such materials as a hot-worked tool steel (e.g., H-13 steel), or an intermetallic material such as nickel-based superalloys. The release agent used to prevent the shot sleeve components from sticking onto the mandrel, or the inside surface of the bomb's body, may simply comprise a thin layer (e.g., 40–150 microns) of a pigmented paint, oil or paper. The bomb itself will preferably be made from steel or cast iron with sufficient mass to contain the explosive forces generated therein. Mandrels used as forming surfaces will preferably comprise steel or cast iron, and will have a draft angle of about 3 degrees to facilitate removal of the mandrel from the shot sleeve after the shot sleeve has been explosively compressed thereabout.

The thicknesses of the various layers of the multilayered shot sleeves made in accordance with the present invention can vary significantly. The embodiments shown in FIGS. 2, 3 and 6, for example, are useful for making shot sleeves having an outer sheath thickness less than about 15 mm. The embodiment shown in FIG. 4 is useful for making shot sleeves having outer sheath thicknesses greater than about 15 mm. In either case, the cermet layer will preferably vary in thickness from about 3 mm to about 10 mm, and the thermally conductive tube vary in thickness from about 5 mm to about 15 mm.

While the invention has been disclosed primarily in terms of certain specific embodiments thereof, it is not intended to be limited thereto, but rather only to the extent set forth hereafter in the claims which follows.

What is claimed is:

1. A method of making a multi-layered shot sleeve for an horizontal, pressure casting machine, said shot sleeve comprising a highly thermally conductive tube having an inside surface comprising a wear-resistant and erosion-resistant cermet, said method comprising the steps of:

a. positioning a mass of cermet precursor particles contiguous said inside surface of said tube, said precursor particles comprising a mixture of ceramic and metal particles;

b. locating said tube and precursor particles in a chamber of a container including a forming surface therein;

c. filling said chamber with an explosive material along the length of said tube on the side of said tube opposite said forming surface; and d. progressively burning said explosive material along the length of said tube so as to create a high pressure front which moves progressively along said length tracking said burning to deform said tube and said particles against said forming surface as said pressure front travels said length and to progressively interatomically bond said particles to each other and to said tube.

2. A method according to claim 1 wherein said forming surface is the external surface of a cylindrical mandrel, said tube is positioned about said mandrel, said particles are located between said mandrel and said tube, and said explosive material is located outboard said tube such that said tube and said particles collapse upon said mandrel during said burning.

3. A method according to claim 1 wherein said material is ignited at one end of said chamber and burns therefrom the length of said tube.

4. A method according to claim 1 wherein said container is a pressure bomb.

5. A method according to claim 4 wherein said forming surface is a wall of said bomb defining said chamber, and said explosive material is located inside said tube such that said tube and particles expand outwardly toward said wall during said burning.

6. A method according to claim 1 wherein said container is a frangible canister destructible by said high pressure front.

7. A method according to claim 6 wherein said canister comprises a polymeric material.

8. A method according to claim 1 wherein said particles are separated from said explosive material by a barrier.

9. A method according to claim 8 wherein said barrier comprises a retainer tube having an outside diameter which is less than the inside diameter of said conductive tube.

10. A method according to claim 1 including providing said forming surface with a release agent for preventing bonding to such surface.

11. A method according to claim 10 wherein said release agent is a discrete tubular member conforming substantially to said forming surface.

12. A method according to claim 10 wherein said release agent comprises a coating on said forming surface.

13. A method according to claim 12 wherein said coating comprises paint.

14. A method of making a multi-layered shot sleeve for an horizontal, pressure casting machine, said shot sleeve comprising a highly thermally conductive tube having a wear-resistant and erosion-resistant cermet lining an inside surface of said tube, and a metal reinforcing sheath surrounding said tube, said method comprising the steps of:

a. positioning a mass of cermet precursor particles contiguous said inside surface of said conductive tube, said precursor particles comprising a mixture of ceramic and metal particles;

b. positioning a metal reinforcing sheath about said conductive tube;

c. locating said sheath, tube and precursor particles in a chamber including a forming surface therein;

d. filling said chamber with an explosive material along the length of said tube on the side of said tube opposite said forming surface; and d. progressively burning said explosive material along the length of said tube so as to create a high pressure front which moves progressively along said length tracking said burning to progressively interatomically bond (i) said particles to each other and to said thermally conductive tube and (ii) said sheath to said tube, and to deform said sheath, tube and particles against said forming surface as said pressure front travels said length.

15. A method according to claim 14 wherein said forming surface is the external surface of a cylindrical mandrel, said tube is positioned about said mandrel, said particles are located between said mandrel and said tube, and said explosive material is located outboard said reinforcing sheath such that said tube and said particles collapse upon said mandrel during said burning.

16. A method according to claim 14 wherein said material is ignited at one end of said chamber and burns therefrom the length of said tube.

17. A method according to claim 14 wherein said container is a pressure bomb.

18. A method according to claim 17 wherein said forming surface is a wall of said bomb defining said chamber, and said explosive material is located inside said conductive tube such that said sheath, tube and particles expand outwardly against said wall during said burning.

19. A method according to claim 18 wherein said particles are separated from said explosive material by a barrier.

20. A method according to claim 19 wherein said barrier comprises a retainer tube having an outside diameter which is less than the inside diameter of said tube.

21. A method according to claim 20 wherein said retainer tube is removed after said shot sleeve is removed from said chamber.

22. A method according to claim 14 including providing said forming surface with a release agent for preventing bonding to such surface.

23. A method according to claim 22 wherein said release agent is a discrete tubular member conforming substantially to said forming surface.

24. A method according to claim 22 wherein said release agent comprises a coating on said forming surface.

25. A method according to claim 24 wherein said coating comprises paint.

* * * * *